3,179,546
METHOD OF BONDING SILICONE RUBBER TO OTHER MATERIALS
David J. Fischer, Midland, Mich., assignor to Dow Corning Corporation, Midland, Mich., a corporation of Michigan
No Drawing. Filed Dec. 3, 1958, Ser. No. 777,852
4 Claims. (Cl. 156—272)

This invention relates to a novel method for bonding silicone rubber to a base member.

The wide variety of uses of silicone rubber has inevitably led to a search for methods for adhering or bonding silicone rubber to other materials. The use of various primers, cements and other intermediate adhesive layers between silicone rubber and base member has been proposed. Some of the proposed methods are quite effective for bonding silicone rubber to some base materials yet are ineffective for such bonding to other materials. Other methods secure a degree of bonding or adhesion but introduce undesirable characteristics such as thermal instability and so forth.

It is quite apparent that a chemical bond between silicone rubber and base materials is desirable. It is the primary object of this invention to secure such a bond at a commercially practical cost. Another object is a means for bonding copper sheets and copper foil to silicone rubber. Other objects and advantages of this invention are disclosed in or will be apparent from the following disclosure and claims.

This invention concerns a method for bonding silicone rubber to a base material which comprises exposing silicone rubber gum or stock, alone or together with the base material to high energy radiation and thereafter activating the potentially reactive sites induced in said rubber by said radiation, while the gum or stock is in contact with the base material.

The silicone polymers which are operative herein are very well-known materials. They are polymeric materials of units of the average formula

wherein each R is a monovalent hydrocarbon radical or a halogenated monovalent hydrocarbon radical and $n$ has a value of 1.9 to 2.1 and preferably 1.99 to 2.01.

In the above formula, R can be any monovalent hydrocarbon radical including alkyl radicals such as methyl, ethyl and octadecyl; aryl radicals such as phenyl and anthracyl; alkaryl radicals such as tolyl, xylyl and methylnaphthyl; aralkyl radicals such as benzyl and phenylethyl; cycloaliphatic radicals such as cyclopropyl and cyclopentyl; and alkenyl radicals such as vinyl, allyl and octadecenyl. R can also represent any halogenated derivatives of the foregoing listed monovalent hydrocarbon radicals including chloromethyl, bromophenyl, iodotolyl, perchlorophenylethyl, perchlorovinyl, chlorofluorovinyl, 3,3,3-trifluoropropyl, and so forth. Of course the radicals represented by R can all be the same or they can be different. The operative polymers can be homopolymers such as polymers made up entirely of dimethylsiloxane units or of methylphenylsiloxane units or the operative polymers can be copolymers of various units such as methylvinylsiloxane units and dimethylsiloxane units or dimethylsiloxane units, methylphenylsiloxane units, 3,3,3-trifluoropropylmethylsiloxane units and dimethylvinylsiloxane units.

As is indicated in the formula the average ratio of organic substituents to silicon atoms in the polymer can be from 1.9 to 2.1 but it is preferred to have this ratio in the range of 1.99 to 2.01. This R/Si ratio indicates that limited quantities of $RSiO_{3/2}$ units and $R_3SiO_{1/2}$ units can be present in the polymer and even very small proportions of $SiO_{4/2}$ units can be tolerated. However, most of the units present in a silicone rubber polymer will be of the formula $R_2SiO$. Particularly useful silicone rubbers are prepared from dimethylsiloxane polymers, 3,3,3-trifluoropropylmethylsiloxane polymers, copolymers of $Me_2SiO$ units and $F_3CCH_2CH_2MeSiO$ units, copolymers of the foregoing polymers and copolymers with

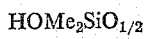

units and any of the foregoing polymers or copolymers with a minor proportion (e.g., less than 10 percent) of vinyl substituted siloxane units.

The polymers described above can be used alone or they can be compounded into silicone rubber stocks by adding fillers, pigments, compression set additives and other materials normally employed as additives in silicone rubber stocks. Most important as additives to the polymer are fillers. Useful as fillers herein are such materials as silicas (both manufactured such as fume silica and silica aerogels and natural such as diatomaceous earth), cork dust, $TiO_2$, ZnO, MgO, $CaCO_3$, clay, bentonite, asbestos, glass flocks, carbon black, zinc sulfide, barium titanate, micronized graphite, micronized slate, micronized mica, crushed quartz, $PbO_2$, blue lead, dehydrated alumina, wood flour and cotton linters. Particularly useful are the silicas and especially the fume silicas and other reinforcing silicas. Surface treatment of such fillers can be accomplished by methods well known in the art if desired.

The silicone polymer and additives are mixed together in any desired manner. Generally the mixing can be done on a two- or three-roll mill. The length of time required for milling will, of course, vary with the polymer viscosity, type of fillers and additives, and so forth. The siloxane polymer can vary from a readily pourable fluid material to gumlike materials of viscosity exceeding 10,000,000 cs. at 25° C. The polymers are generally soluble in organic solvents although specially prepared solvent resistant polymers such as 3,3,3-trifluoropropylmethylsiloxane polymers may require specific solvents such as acetone.

The base materials to which the silicone rubber can be bonded can be solid sheetlike material including metals, plastics, organic rubbers and even paper. Metals such as magnesium, copper, silver, steel, aluminum, titanium, zinc, brass, bronze and other metals and alloys can be coated, laminated, bonded together and so forth with silicone rubber by the method of this invention. Similarly, plastics such as polyethylene films, styrene sheets, polytetrafluoroethylene, polychlorotrifluoroethylene sheets, and other polymeric halogenated organic sheets and so forth can be bonded to layers of silicone rubber. Natural rubber and synthetic rubbers can be formed into unitary structures with silicone rubbers by the method of this invention.

Obvious uses for this method include the manufacture of copper foil bonded to a silicone rubber for use in printed circuitry, metals coated with silicone rubber for air ducts in aircraft, and protective coatings of silicone rubber on plastic sheets and films. Other uses will be obvious to persons skilled in the art.

To accomplish the desired bonding of the silicone rubber to the base material, the unvulcanized silicone rubber gum or a rubber stock comprising the siloxane polymer plus filler and any other desired additives but without any vulcanizing agent, is subjected to high energy radiation such as gamma rays, beta rays, neutrons, accelerated electrons, and heavy particles, X-rays and so forth. Particle accelerators, radioactive isotopes, X-ray equipment, and atomic piles serve as convenient sources for the desired radiation.

The amount of radiation from a given source necessary to secure a particular degree of bonding between any silicone rubber gum or stock and a particular base material can be determined by empirical methods. Generally, longer exposure to a given source or exposure to a higher energy source will produce stronger bonding. Furthermore, the nature of the silicone polymer must be considered because polymers having phenyl substituents require larger doses of radiation to secure bonding as compared to methylsiloxane polymers.

In order to secure the desired bonding, the silicone rubber material must be brought into intimate contact with the base material. This can be done before the rubber is subjected to the high energy radiation or after it is so irradiated. After the rubber is irradiated and brought into contact with the base material, the peroxidic and hydroperoxidic or other active sites produced in the silicone rubber by the high energy radiation are activated. This activation can easily be accomplished by heating the rubber in contact with the base materials. Another means for activating the reactive sites within the rubber is to include small amounts of iodine in the stock. The presence of the iodine has a secondary effect on the reactive sites and activates these sites at room temperature or even below.

The activation of the reactive sites and the subsequent chemical action between such sites and the adjacent base material brings about adhesion between the surfaces. A chemical bond between the silicone rubber and the base material is initiated. Thus a strong, permanent bond is created.

The following examples are included herein to aid those skilled in the art in understanding and practicing this invention. The examples do not limit the scope of this invention which is properly delineated in the claims. All parts and percentages in the examples are based on weight unless otherwise indicated. The symbols "Me," "Ph," "Vi" and "Et" represent the methyl radical, phenyl radical, vinyl radical and ethyl radical in the entire specification.

Example 1

A dimethylpolysiloxane polymer having a viscosity in excess of 1,000,000 cs. at 25° C. was pressed at room temperature to form a sheet $\frac{1}{16}$ inch thick between polyethylene films. The siloxane polymer-polyethylene sandwich was subjected to 1.63 megarads of gamma radiation from a cobalt-60 source. The sandwich was removed from the radiation area and was thereafter heated to 100° C. for 9 hours. The polyethylene films were firmly bonded to the silicone rubber by this procedure.

Example 2

A sample of a dimethylpolysiloxane gum having a viscosity exceeding 1,000,000 cs. at 25° C. was pressed to form a sheet $\frac{1}{16}$ inch thick and this sheet was placed between sheets of polyethylene film. The assembly was then subjected to 1.61 megareps of gamma radiation from a cobalt-60 source. The assembly was then removed from the radiation area and the polyethylene sheets were easily removed from the irradiated silicone gum. The irradiated gum sheet was then placed on a magnesium plate and the magnesium plate-silicone rubber gum assembly was heated at 142° C. for one hour in an air circulating oven. The assembly was then removed from the oven and cooled to room temperature. The silicone rubber was firmly and uniformly bonded to the magnesium plate.

Example 3

Example 2 was repeated using a copolymeric siloxane gum containing 92 mol percent of dimethylsiloxane units and 8 mol percent of methylvinylsiloxane units and again the resulting silicone rubber was firmly and uniformly bonded to the magnesium plate.

Example 4

A siloxane rubber stock consisting of 100 parts of a copolymeric siloxane containing about 0.15 mol percent methylvinylsiloxane units and the balance being dimethylsiloxane units, 60 parts of fume silica, about 17 parts of a hydroxyl endblocked dimethylpolysiloxane polymer of about 50,000 cs. at 25° C., 5 parts of barium zirconate and 1 part of zinc oxide was prepared by milling the listed ingredients on a three-roll mill until a uniform mix was obtained. The stock was pressed between polyethylene sheets to form sheets having thickness of $\frac{1}{16}$ inch and $\frac{1}{32}$ inch. The stock and polyethylene sheets were then subjected to high intensity irradiation with a Van de Graaff particle accelerator. With this system of irradiation, the silicone rubber stock was irradiated and heated at the same time and when the assemblies were removed from the irradiation source, the polyethylene was firmly and uniformly adhered to the silicone rubber.

Example 5

A dimethylpolysiloxane gum having a viscosity exceeding 1,000,000 cs. at 25° C. was thoroughly milled with 1 percent of free iodine until a uniform dispersion of the iodine in the gum was achieved. The gum plus iodine was then pressed between polyethylene sheets to a thickness of $\frac{1}{16}$ inch. The assembly of polyethylene sheets plus silicone rubber was subjected to 8.0 megarads of gamma radiation from a cobalt-60 source. The material was removed from the radiation area and it was found that the silicone rubber was firmly and uniformly bonded to the polyethylene sheets. The adhesion between polyethylene and silicone rubber was greater than the cohesion of the rubber as disclosed when attempts to remove the polyethylene sheets from the rubber resulted in rupturing the rubber rather than rupturing the bond between rubber and polyethylene.

Example 6

Example 2 was repeated using a copper plate, an aluminum plate and a stainless steel plate rather than a magnesium plate and a firm, uniform bond between silicone rubber and each of the metal plates was achieved.

That which is claimed is:

1. A method for bonding silicone rubber consisting essentially of a siloxane polymer of the average unit formula $$R_n SiO_{\frac{4-n}{2}}$$

where each R is selected from the group consisting of monovalent hydrocarbon radicals and halogenated monovalent hydrocarbon radicals and $n$ has an average value of from 1.9 to 2.1 containing a small amount of iodine to a solid, sheetlike material selected from the group consisting of magnesium, copper, brass, bronze, steel, silver, aluminum, titanium, zinc, polyethylene film polystyrene film, polytetrafluoroethylene film and polychlorotrifluoroethylene film consisting essentially of placing the silicone rubber in intimate contact with the sheetlike material in a high energy radiation field to expose it to such radiation.

2. The method of claim 1 further characterized in that the silicone rubber contains a filler.

3. The method of claim 2 wherein the filler is silica.

4. The method of claim 1 wherein each R is a methyl radical.

References Cited by the Examiner

UNITED STATES PATENTS

| | | | |
|---|---|---|---|
| 2,470,593 | 5/49 | Webb et al. | 220—64 |
| 2,601,336 | 5/52 | Smith-Johannsen | 154—130 |
| 2,668,133 | 2/54 | Brophy | 154—126 |
| 2,708,289 | 5/55 | Collings. | |
| 2,763,609 | 9/56 | Lewis | 204—154 |
| 2,781,288 | 2/57 | Polmonteer. | |
| 2,959,569 | 11/60 | Warrick | 260—46.5 |
| 2,976,185 | 3/61 | McBride | 117—138.8 |
| 2,997,418 | 8/61 | Lawton | 154—126 |
| 3,033,807 | 5/62 | Krueckel | 260—375 XR |
| 3,056,735 | 10/62 | Smith-Johannsen | 204—154 |

OTHER REFERENCES

"Effects of Atomic Radiation on High Polymers," Modern Plastics, September 1954, pp. 141–144; 146, 148, 150, 229–233, 236–238 (pp. 148, 232 and 233 relied on).

Silicones, by Meals, Lewis; page 6; Reinhold Publishing Corp., TP248S5M4.

EARL M. BERGERT, *Primary Examiner.*

JOSEPH REBOLD, CARL F. KRAFFT, *Examiners.*